United States Patent
Hirao

[11] Patent Number: 5,999,704
[45] Date of Patent: *Dec. 7, 1999

[54] IMAGE OUTPUT APPARATUS

[75] Inventor: Kouichirou Hirao, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/834,299

[22] Filed: Apr. 15, 1997

[30] Foreign Application Priority Data

Apr. 15, 1996 [JP] Japan .................................. 8-092193

[51] Int. Cl.$^6$ ..................................................... G03G 15/00
[52] U.S. Cl. ............................. 395/109; 358/298; 358/462
[58] Field of Search ..................................... 358/456, 462, 358/296, 298; 382/299, 275; 395/109

[56] References Cited

U.S. PATENT DOCUMENTS

| | | | |
|---|---|---|---|
| 4,588,841 | 5/1986 | Shimada | 358/296 |
| 4,709,274 | 11/1987 | Tanioka | 358/455 |
| 5,294,996 | 3/1994 | Sobue | 358/298 |
| 5,301,271 | 4/1994 | Hiratsuka et al. | 358/443 |
| 5,565,907 | 10/1996 | Wada et al. | 358/298 |
| 5,657,071 | 8/1997 | Shinohara | 347/252 |
| 5,708,514 | 1/1998 | Higuchi et al. | 358/298 |

FOREIGN PATENT DOCUMENTS

| | | | |
|---|---|---|---|
| 58-150978 | 9/1983 | Japan | H04N 1/12 |
| 2-301780 | 12/1990 | Japan | H04N 1/04 |
| 3-173656 | 7/1991 | Japan | H04N 1/22 |
| 4-138265 | 5/1992 | Japan | H04N 2/44 |

*Primary Examiner*—Amelia Au
*Assistant Examiner*—Jingge Wu
*Attorney, Agent, or Firm*—Sughrue, Mion, Zinn, Macpeak & Seas, PLLC

[57] ABSTRACT

In printing a pseudo half tone image, the pulse width of an image data pulse is reduced, so that when isolated dots in the image are printed, the isolated dot part become whitish and repeatability may be lowered. A region division section judges whether the data are binary data of characters or the pseudo half tone image data. For the pseudo half tone image data, a dot pattern identification section discriminates consecutive dots from isolated dots. An image data pulse control section controls the pulse width of the image data pulse in accordance with the result of the identification. A printer engine performs print as output with each dot of which dimension is dependent on the controlled pulse width. Therefore when the image with characters and pictures mixed together is output, the printing as output can be performed in accordance with the character region and the pseudo half tone image region.

20 Claims, 4 Drawing Sheets

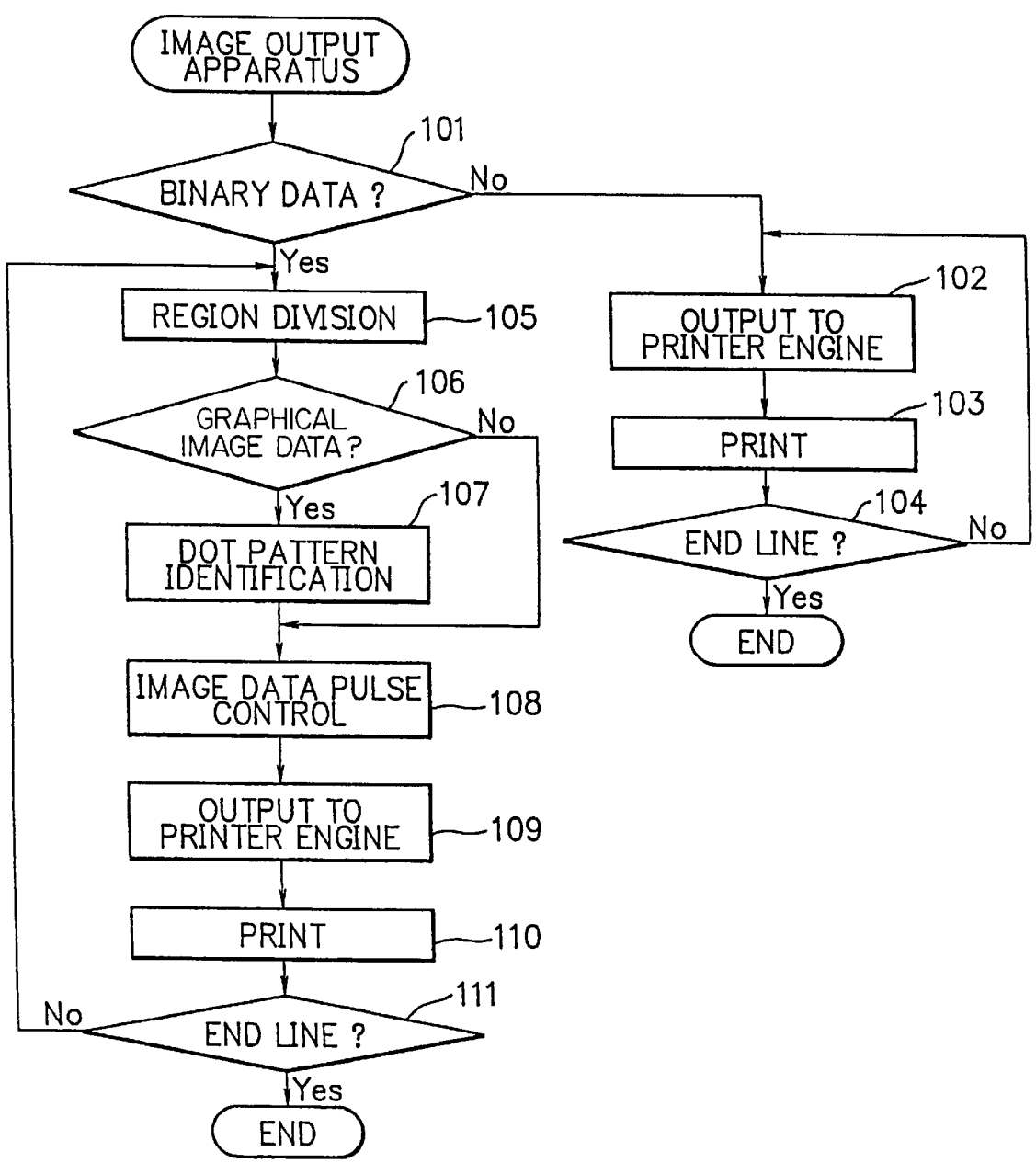

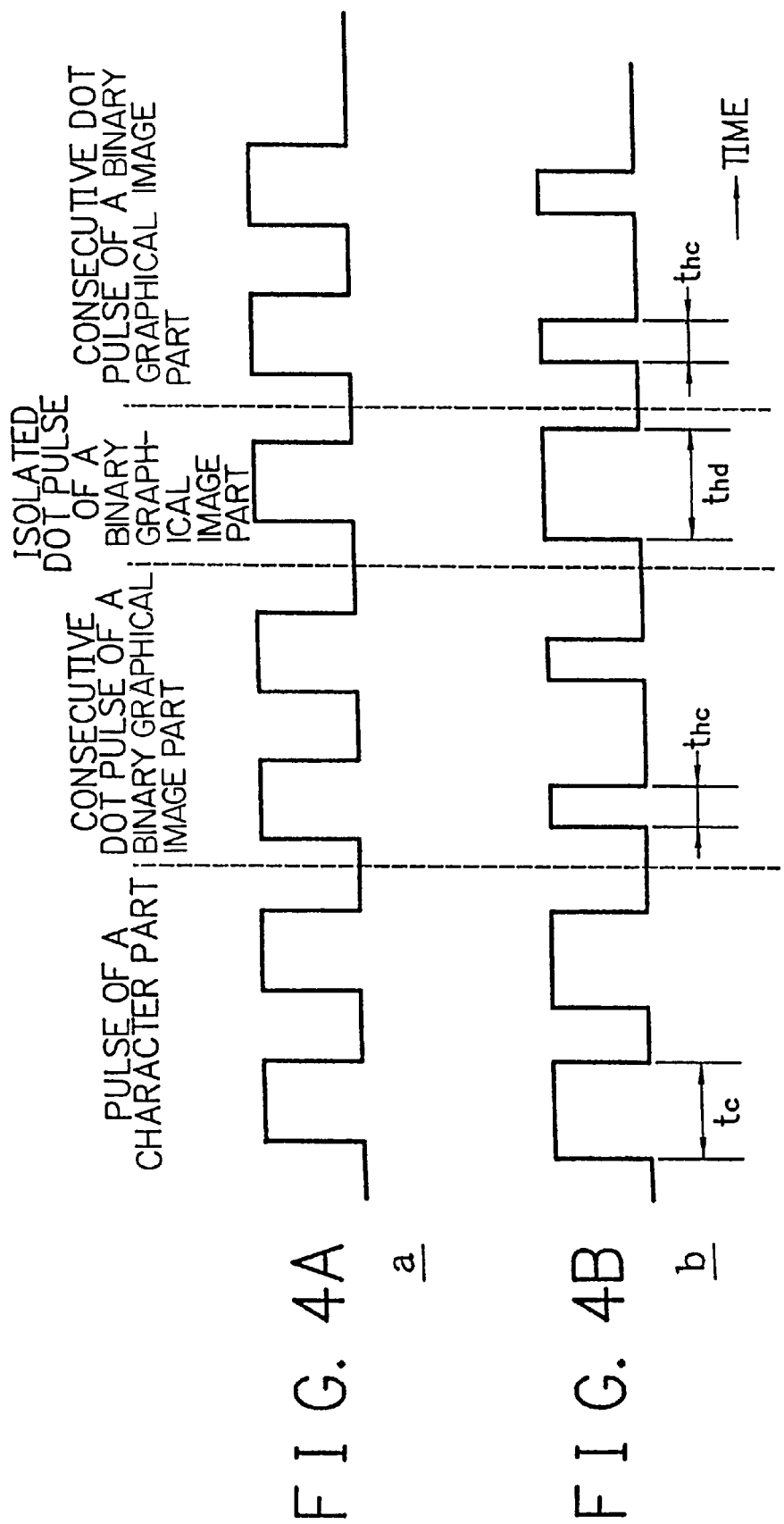

IMAGE OUTPUT APPARATUS

BACKGROUND OF THE INVENTION

The present invention relates to an image output apparatus, and in particular to an image output apparatus controlling the output both of characters and a binary graphical image.

Description of the Related Art

A conventional image output apparatus, when such lines as a character line are printed so as to arrange each print pixel represented by slant lines in FIG. 1A in direct and consecutive, in practice, performs control for extending the print size of one pixel represented by slant lines as shown in FIG. 1B, so as to maintain the smoothness of the line.

However, according to the process of the aforementioned control, when such binary graphical images as pictures are printed in the binary image data, the same control as that of the characters is performed, which causes the increase in dimension of the print size of a dot and consequently, leads to a lowering of gradation repeatability.

Such an art is already well-known as a means for solving the above problem by which the pulse width of an image data pulse is increased to extend the print size of a pixel for the character region, and the pulse width of the image data pulse is reduced to make the print size of a pixel small (Japanese patent Application Laid-Open No. 4-342359 BINARY IMAGE FORMING APPARATUS).

According to the image output apparatus applying the art described above, in such images as a character, the print size of a pixel is large, so that a thick, clear and smooth image can be obtained. While, in such binary graphical images as pictures, the print size of a pixel is small, so that the image with no better and high gradation repeatability can be obtained.

The conventional image output apparatus described above provides the clear and smooth character and further satisfactory repeatability in the binary graphical image. However, in printing the binary graphical image, the pulse width of the image data pulse is reduced, namely, the print size of a pixel diminishes, and hence it become difficult for a toner to adhere to the recording paper. Therefore, when the isolated dots in the image are printed, the isolated dots may become whitish and may lead to a lowering of gradation repeatability.

SUMMARY OF THE INVENTION

In view of the foregoing, it is an object of the present invention to provide an image output apparatus by which a clear and smooth image can be sent for such images as characters, while, the image with high gradation repeatability as well as the isolated dot part can be sent for such binary graphical image as a picture.

According to one aspect of the invention for achieving the above mentioned object, there is provided an image output apparatus having a determination section for deciding the image data to be output whether to be binary image data or multivalued image data, a region division section for judging the binary data decided in the determination section to be the binary data of characters or binary graphical image data subjected to region division, a dot pattern identification section for identifying the binary graphical image data being subjected to region division in the region division section as consecutive dots or isolated dots, and sending the result of the identification, an image data pulse control section for controlling the pulse widths of said binary data of characters divided in the region division section and the binary graphical image data discriminated in the dot pattern identification section in accordance with the decision for consecutive dots or isolated dots and a printing means for performing printing output with the dots of which dimensions are dependent on the pulse width controlled in the image data pulse control section, and also printing the multivalued image data determined in the determination section.

As stated above, an image data output apparatus according to the present invention, it is decided whether characters are the binary image data or the binary graphical image data which is identified to be the consecutive dots or the isolated dots, and the pulse width of the image data pulse is controlled in accordance with the result of the identification. When an image with characters and pictures mixed together is sent out, it is possible to print in accordance with the character region and the binary graphical image region such as a picture and the like by printing with each dot of which dimension is dependent on the controlled pulse width.

BRIEF DESCRIPTION OF THE DRAWINGS

The objects and features of the present invention will become more apparent from the consideration of the following detailed description taken in conjunction with the accompanying drawings in which:

FIG. 3 is a flow chart showing the operation of FIG. 2; and

FIGS. 4A and 4B are diagrams describing the control for the pulse width of the image data pulse of the main part of FIG. 2.

DESCRIPTION OF THE PREFERRED EMBODIMENTS

A preferred embodiment of the invention will now be described in detail referring to the accompanying drawings.

Figure 1A:
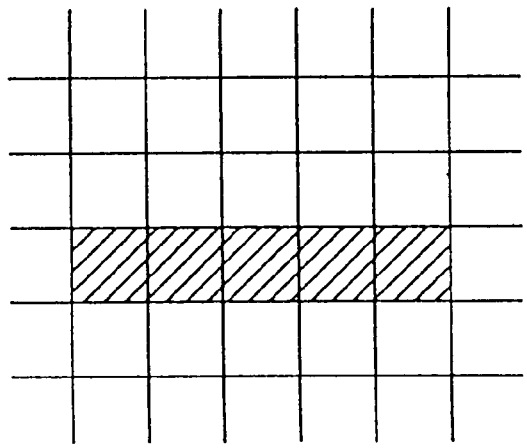
FIGS. 1A and 1B are diagrams showing an example of the control for the print size of a conventional apparatus.
Figure 1B:
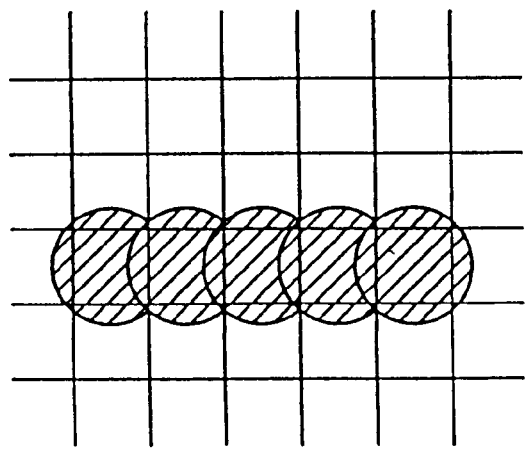
Figure 2:
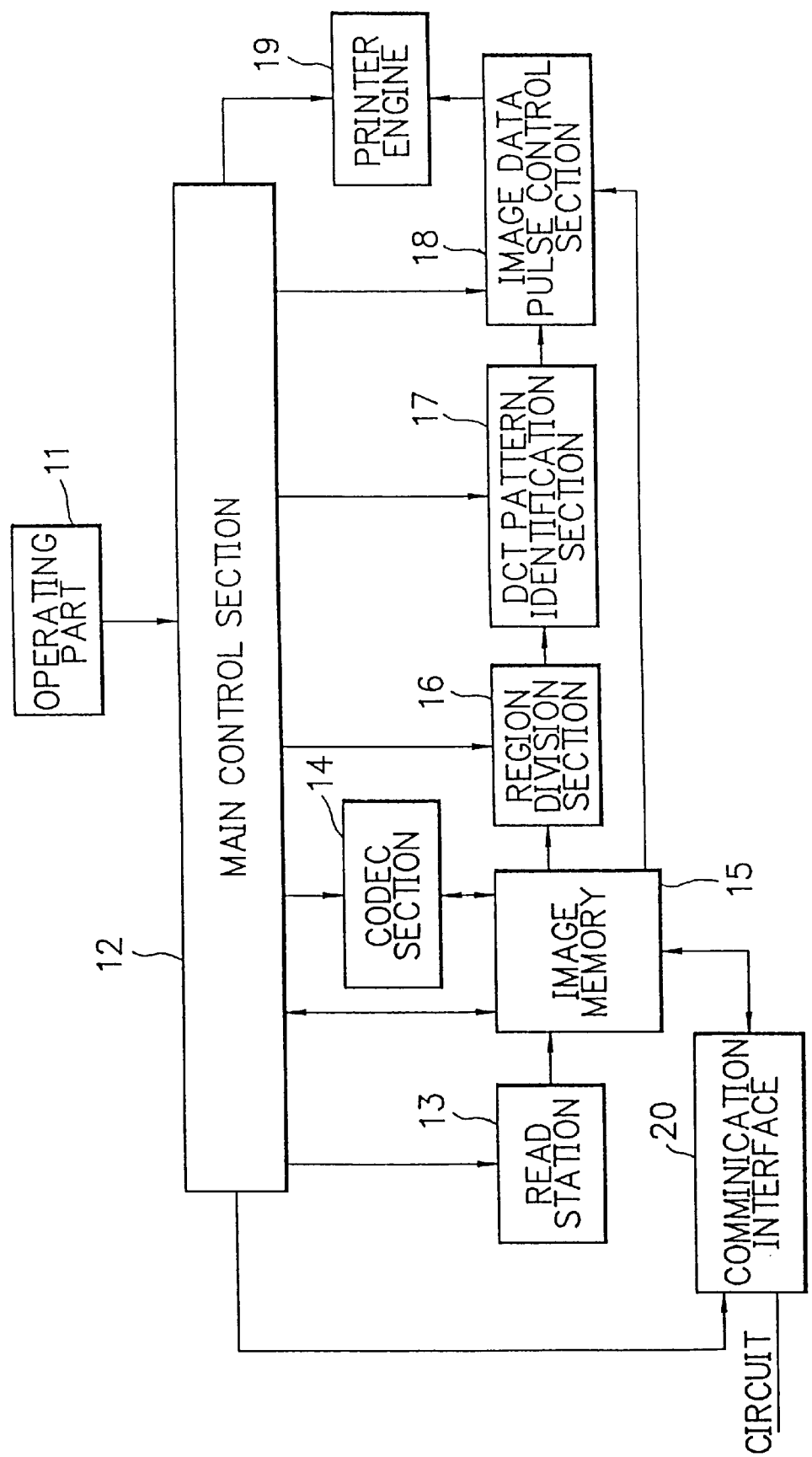
FIG. 2 is a block diagram showing the embodiment according to the present invention.

FIG. 2 is a block diagram showing an embodiment of the image output apparatus according to the present invention.

The image output apparatus of FIG. 2 is an example applied to a facsimile apparatus, which comprises an operating part 11 for implementing various operations of the apparatus, a main control section 12 for controlling each section, a read station 13 for converting transmitted manuscripts into read-image data, a coder-decoder (hereafter referred as CODEC) section 14 for encoding the read image data for transmission and for decoding the received image data for output, an image data memory section 15 for storing the image data, a region division section 16 for, when the image data is a binary image data, dividing the binary image data into a character region or a binary graphical image region, a dot pattern identification section 17 for identifying the dot as a consecutive one in the binary graphical image region or an isolated one and outputting the result of the identification, an image data pulse control section 18 for controlling the pulse width of each region of the above binary image data based upon the identified result by the region division section 16 and the dot pattern identification section 17, a printer engine 19 for printing on a recording paper, after receiving the image data pulse modulated by the image data pulse control section 18, and a communication interface 20 for performing a communication with such circuits as transmission and reception.

The read station 13 is able to recognize the image with characters only as binary data as it were. Whereas when recognized as binary images, an image with characters and pictures mixed together, a picture and the like are converted into the binary graphical image data to be read by a DTER method or an error diffusion method because such a picture and the others are multivalued images. In case of the image with pictures only, it is sometimes read as the multivalued image.

The description will be given in the operation of the embodiment of the present invention with referring to the flow chart of FIG. 3 and the time chart of the binary data pulse of FIG. 4. Referring now to FIG. 2, the image data received via the communication interface 20 are decoded in the CODEC section 14 to be stored into the image memory 15. The image data stored in the image memory 15 are outputted in accordance with the flow chart shown in FIG. 3.

Namely, the main control section 12 decides whether the image data stored in the image memory 15 is binary image data or multivalued image data in accordance with a header added to the image data (step 101). In case of multivalued image data, outputting to the printer engine 19 (step 102) and the image data read from the image memory 15 are printed on the recording paper (step 103). The process of printing aforementioned multivalued image data by the printer engine 19 is repeated until the end line (step 102~104).

While, when the main control section 12 judges the image data stored into the image memory 15 to be the binary image data with pictures and characters mixed together, the binary image data are sent from the image memory 15 to the region division section 16 (step 105) and being decided whether to be the character region or the binary graphical image region (step 106).

When judged to be the binary graphical image region, the binary image data are fed to the dot pattern identification section 17, where each dot pattern of the binary image data, namely a consecutive dot or an isolated dot, is discriminated for every pulse of the data of the pseudo half tone image region (step 107). Consequently, the binary image data is provided to the image data pulse control section 18 synchronously with the result of discrimination described above. The binary image data decided to be the character region at step 106 are provided to the image data pulse control section 18 without aforementioned discrimination of the dot pattern.

As shown in FIGS. 4A and 4B, the image data pulse control sectional 18 implements respective image data pulse control to the image data to be printed whether to be the characters or the consecutive dots or the isolated dots of the binary graphical image region (step 108). Referring to FIGS. 4A and 4B, there is shown an example of the original signal a of the binary image data and the modulated binary image data signal b. A high level indicates a black and a low level indicates a white.

The image data pulse control section 18 performs control for increasing the pulse width of the image data in the character region as compared with the original signal as shown by '$t_c$' in FIG. 4B. Hence, in printing characters, the printing diameter of a dot is larger than the dimension of a pixel element, which leads to obtain clear and smooth characters.

The image data pulse control section 18 performs control for reducing the pulse width of the image data equivalent to the consecutive dot part of the binary graphical image as compared with the original signal as shown by '$t_{hc}$' in FIG. 4B. As a result, in printing, the printing diameter of a dot is equal to the dimension of a pixel element, which enables to obtain the eminent gradation repeatability in the region where the consecutive dots of the binary graphical image region exist.

Moreover, the image data pulse control section 18 performs control for increasing the pulse width of the image data equivalent to the isolated dot part of the binary graphical image as compared with the original signal as shown by '$t_{hd}$' in FIG. 4B. As a result, in printing, the printing diameter of a dot is larger than the dimension of a pixel element, which enables the dots to be sent out with certainty on the recording paper to obtain the eminent gradation repeatability in the region where the isolated dots of the binary graphical image region exist.

Both the pulse width $t_c$ of the image data equivalent to the character data in printing characters and the pulse width $t_{hd}$ of the image data equivalent to the isolated dots in printing the isolated dots of the binary graphical image perform control for increasing the pulse width in comparison with the original signal, but the widths are not identical. The characters printed on the recording paper can be easily identified if the dot diameter is somewhat reduced because most of the dots are consecutive. While, in case of the isolated dots of the binary graphical image, the dot width is required to be increased so that the isolated dots can be surely printed on the recording paper to be identified. In other words, it is required that the pulse width of the image data equivalent to the isolated dots of the binary graphical image is larger than the pulse width of the pulse equivalent to the character data. Accordingly, it comes to $t_c < t_{hd}$.

Above image data modulated through the process of aforementioned control are sent to the printer engine 19 (step 110). and after modulation described above, each dot is printed with a dimension in accordance with the pulse width of each image data pulse (step 110). Subsequently, the line of the printed image data group is judged to be the end line or not (step 111), and aforementioned processing operations of the steps 105 to 111 are repeated until the print of the end line is completed.

The present invention is not limited to a facsimile apparatus. It is explicit that the present invention is applicable to such apparatuses as a copying machine, a printer and the like having a device which reproduces the binary image including characters and the binary graphical image data.

As described above, according to the present invention, it is decided whether characters are the binary image data or the binary graphical image data which are identified to be the consecutive dots or the isolated dots, and the pulse width of the image data pulse is controlled in accordance with the result of the identification. When an image with characters and pictures mixed together are sent out, it become possible to print in accordance with the character region and the binary graphical image region such as a picture and the like by printing with each dot of which dimension is dependent on the controlled pulse width. Hence, it is possible to get the distinct image with a plain character line for the character image, and to get the image with great gradation repeatability for the binary graphical image such as a picture in both regions where the dots are consecutive and where the dots are isolated.

According to the present invention, the image data pulse control section performs control for increasing the pulse width of the image data pulse corresponding to the isolated dot data of the binary graphical image data lower than that of the image data pulse corresponding to the binary data of characters, so that most dots are consecutive. Therefore, the character data can be repeatably printed on the recording paper even if the dot diameter is somehow reduced, and the isolated dots of the binary graphical image can be output with certainty on the recording paper.

While preferred embodiment of the invention have been described using specific terms, such description is for illustrative purpose only, and it is to be understood that changes and variations may be made without departing from the spirit or scope of the following claims.

What is claimed is:

1. A method for reproducing image data including multivalued data and binary image data, wherein said binary image data can include binary character data and binary graphical image data, comprising:

identifying said binary graphical image data as consecutive dots or isolated dots;

generating binary image data pulses representative of said binary image data, by setting the pulse width of said binary image data pulses corresponding to said consecutive dots of said binary graphical image data to a first pulse width;

setting the pulse width of said binary image data pulses corresponding to said binary character data to a second pulse width that is larger than said first pulse width; and setting the pulse width of said binary image data pulses corresponding to said isolated dots of said binary graphical image data to a third pulse width that is larger than said second pulse width; and reproducing said binary image data according to said generated binary image data pulses.

2. The method as set forth in claim 1, further comprising generating multivalued image data pulses corresponding to multivalued data.

3. The method as set forth in claim 2, further comprising reproducing said multivalued data according to said generated multivalued image data pulses.

4. The method as set forth in claim 1, further comprising generating said binary image data pulses of said first pulse width for consecutive dots of said binary graphical image data that immediately follow an isolated dot of said binary graphical image data.

5. An apparatus for reproducing image data including multivalued data and binary image data, wherein said binary image data can include binary character data and binary graphical image data, comprising:

a dot pattern identification section for identifying said binary graphical image data as consecutive dots or isolated dots;

an image data pulse control section for generating binary image data pulses representative of said binary image data, by setting the pulse width of said binary image data pulses corresponding to said consecutive dots of said binary graphical image data to a first pulse width;

setting the pulse width of said binary image data pulses corresponding to said binary character data to a second pulse width that is larger than said first pulse width; and setting the pulse width of said binary image data pulses corresponding to said isolated dots of said binary graphical image data to a third pulse width that is larger than said second pulse width; and a reproduction section for reproducing said binary image data according to said generated binary image data pulses.

6. The apparatus as set forth in claim 5, wherein said image data pulse control section further generates multivalued image data pulses corresponding to multivalued data.

7. The apparatus as set forth in claim 6, wherein said reproducing section further reproduces said multivalued data according to said generated multivalued image data pulses.

8. The apparatus as set forth in claim 5, wherein said image data pulse control section further generates said binary image data pulses of said first pulse width for consecutive dots of said binary graphical image data that immediately follow an isolated dot of said binary graphical image data.

9. A method for reproducing image data, comprising:

determining whether said image data is binary image data or multivalued image data;

determining if said binary image data includes binary character data and binary graphical image data;

identifying said binary graphical image data as consecutive dots or isolated dots;

generating a series of binary image data pulses representative of binary image data, by setting the pulse width of said binary image data pulses corresponding to said consecutive dots of said binary graphical image data to a first pulse width;

setting the pulse width of said binary image data pulses corresponding to said binary character data to a second pulse width that is larger than said first pulse width; and setting the pulse width of said binary image data pulses corresponding to said isolated dots of said binary graphical image data to a third pulse width that is larger than said second pulse width; and reproducing said binary image data according to said image data pulses.

10. The method as set forth in claim 9, further comprising generating multivalued image data pulses corresponding to multivalued data.

11. The method as set forth in claim 10, further comprising reproducing said multivalued data according to said generated multivalued image data pulses.

12. The method as set forth in claim 9, further comprising generating said binary image data pulses of said first pulse width for consecutive dots of said binary graphical image data that immediately follow an isolated dot of said binary graphical image data.

13. An apparatus for reproducing image data, comprising:

a determination section for determining whether said image data is binary image data or multivalued image data;

a region division section for determining if said binary image data includes binary character data and binary graphical image data;

a dot pattern identification section for identifying said binary graphical image data as consecutive dots or isolated dots;

an image data pulse control section for generating a series of binary image data pulses representative of binary image data, by setting the pulse width of said binary image data pulses corresponding to said consecutive dots of said binary graphical image data to a first pulse width;

setting the pulse width of said binary image data pulses corresponding to said binary character data to a second pulse width that is larger than said first pulse width; and setting the pulse width of said binary image data pulses corresponding to said isolated dots of said binary graphical image data to a third pulse width that is larger than said second pulse width; and a reproduction section for reproducing said binary image data according to said image data pulses.

14. The apparatus as set forth in claim 13, wherein said image data pulse control section further generates multivalued image data pulses corresponding to multivalued data.

15. The apparatus as set forth in claim 14, wherein said reproducing section further reproduces said multivalued data according to said generated multivalued image data pulses.

16. The apparatus as set forth in claim 13, wherein said image data pulse control section further generates said binary image data pulses of said first pulse width for said consecutive dots of said binary graphical image data that immediately follow said isolated dots of said binary graphical image data.

17. A method of controlling the pulse width of image data pulses representing binary image data composed of binary character data and binary graphical image data, wherein the image data pulses of the binary image data have an initial pulse width, comprising:

identifying dots of the binary graphical image data as consecutive dots or isolated dots;

increasing the pulse width of said image data pulses corresponding to said binary character data from the initial pulse width to a first pulse width;

decreasing the pulse width of said image data pulses corresponding to said consecutive dots of said binary graphics data from the initial pulse width to a second pulse width; and increasing the pulse width of said image data pulses corresponding to said isolated dots of said binary graphics data identified from the initial pulse width to a third pulse width that is greater than said first pulse width.

18. The method as set forth in claim 17, wherein said image data pulses are decreased to said second pulse width for consecutive dots of said binary graphical image data that immediately follow an isolated dot of said binary graphical image data.

19. An apparatus for reproducing binary image data that includes binary character data and binary graphical image data by controlling the pulse width of image data pulses representing binary image data composed of binary character data and binary graphical image data, wherein the image data pulses of the binary image data have an initial pulse width, comprising:

a dot pattern identification section for identifying dots of the binary graphical image data as consecutive dots or isolated dots;

an image data pulse control section for controlling the pulse width of binary image data pulses representative of binary image data, by increasing said pulse width of said binary image data pulses corresponding to said binary character data from said initial pulse width to a first pulse width;

decreasing said pulse width of said binary image data pulses corresponding to consecutive dots of said binary graphical image data from said initial pulse width to a second pulse width; and increasing said pulse width of said binary image data pulses corresponding to isolated dots of said binary graphical image data from the initial pulse width to a third pulse width that is greater than said first pulse width; and a reproduction section for reproducing said binary image data in accordance with said binary image data pulses.

20. The apparatus as set forth in claim 19, wherein said image data pulse control section sets said pulse width of said binary image data pulses to said second pulse width for consecutive dots of said binary graphical image data that immediately follow an isolated dot of said binary graphical image data.

* * * * *